No. 828,619. PATENTED AUG. 14, 1906.
C. W. MARSH.
AUTOMATIC GATE.
APPLICATION FILED FEB. 8, 1905.
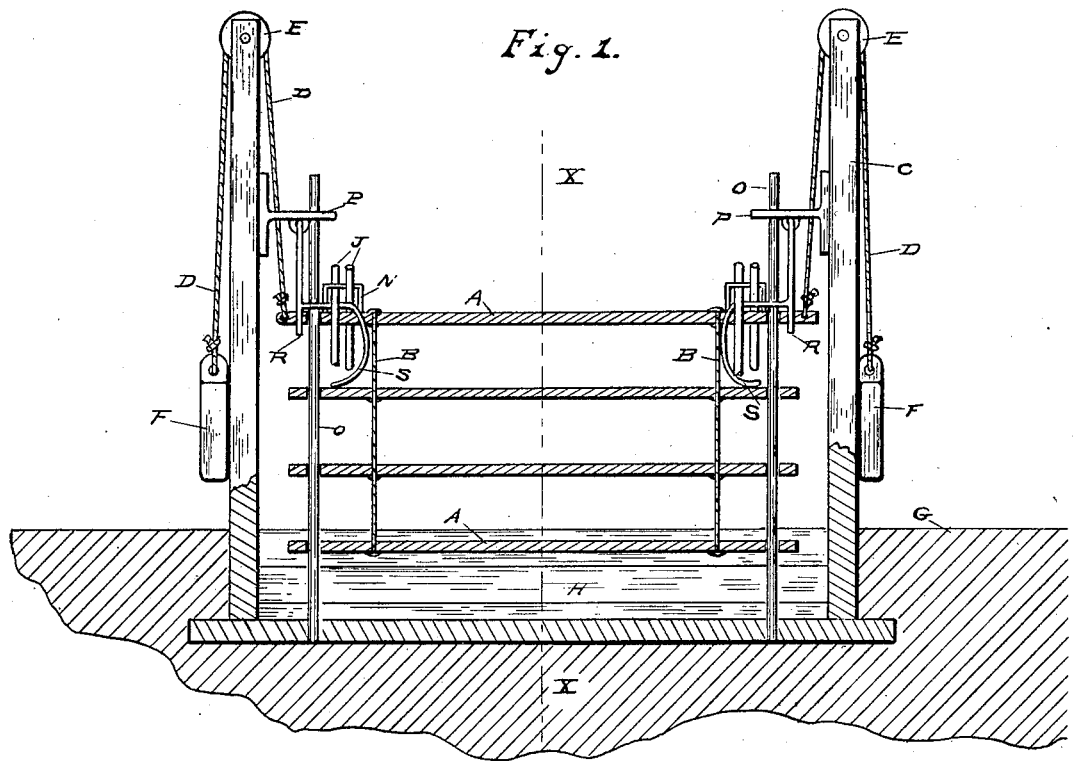
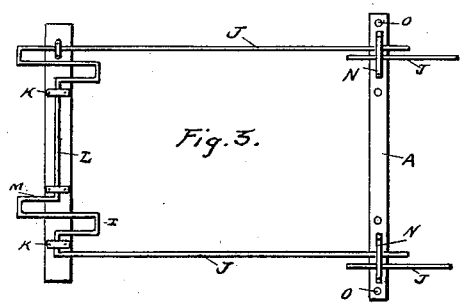
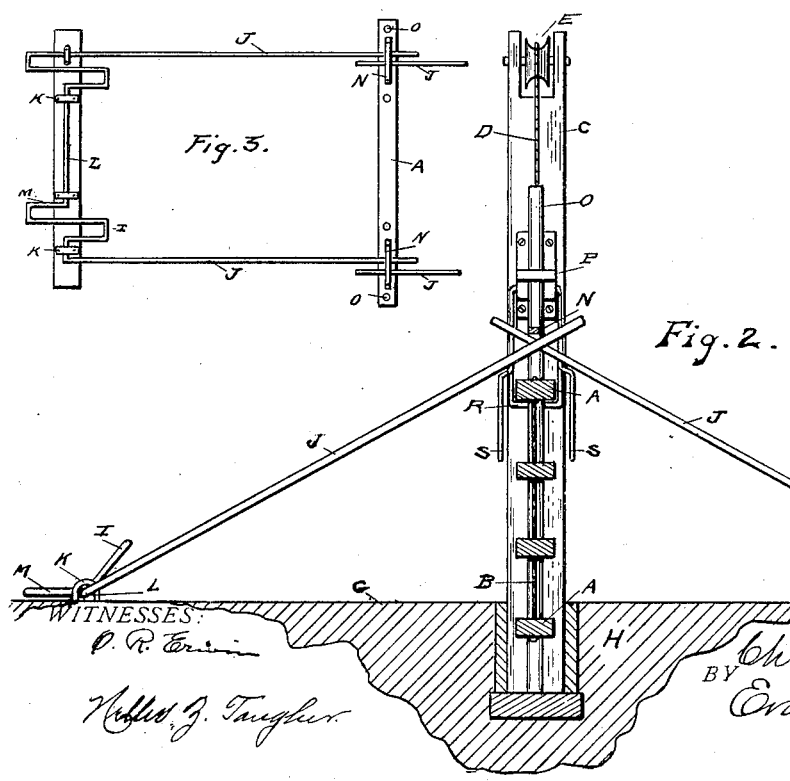

UNITED STATES PATENT OFFICE.

CHARLES W. MARSH, OF BERLIN, WISCONSIN.

AUTOMATIC GATE.

No. 828,619.     Specification of Letters Patent.     Patented Aug. 14, 1906.

Application filed February 8, 1905. Serial No. 244,693.

*To all whom it may concern:*

Be it known that I, CHARLES W. MARSH, a citizen of the United States, residing at Berlin, county of Green Lake, and State of Wisconsin, have invented new and useful Improvements in Automatic Gates, of which the following is a specification.

My invention relates to improvements in automatic gates, and it pertains to that class in which a plurality of horizontal bars comprising the gate are automatically raised and lowered by contact of the wheels of a vehicle with the arms of an actuating-lever.

The construction of my invention is explained by reference to the accompanying drawings, in which—

Figure 1 is a front view of the gate, gate-supporting posts, and operating mechanism; and Fig. 2 is a transverse section of the same, drawn on line x x of Fig. 1. Fig. 3 is a top view of the upper gate-bar and bar-actuating levers.

Like parts are identified by the same reference-letters in the several views.

A A represent a series of horizontal gate-bars which are connected together near their ends by chains or other flexible connections B, and said bars are suspended from the posts C by the cords D D operating over the pulleys E E. The bars thus connected together are counterbalanced by the weights F F, which are suspended from the free ends of said cords D.

It will be obvious that when the bars of the gate are thus counterbalanced they will be easily raised or lowered by simply overcoming the friction of the moving parts. The gate is opened by bringing pressure to bear upon the upper bar A, whereby the several bars in the series are brought together and forced below the upper surface of the driveway into the chamber H, whereby a vehicle may pass over them without contact therewith.

A downward pressure is communicated to the respective ends of the upper bar A as a vehicle approaches the gate from either direction by contact with one of the short arms of an operating-lever.

I I represent the short arms of the operating-levers, which are pivotally fulcrumed to the staples K by the horizontal bend L, while the long arms J of said lever rest upon the upper bar A of the series, whereby as the pressure of the wagon is brought against said short arms I the long arms J will be forced downwardly, thereby bringing said series of bars A together and forcing them beneath the level of the driveway into the chamber H. When, however, the vehicle has passed over the bars and is moving away from the gate, the wheels are brought in contact with the short arms M of said operating-levers, which short arms M are rigidly connected with the arms I and J and are always brought to the vertical when said bars are down. Thus it will be obvious that as the arms M are forced down from the vertical to the horizontal the long arms J of said levers are thrown upwardly into the position indicated in Fig. 2, whereby said series of bars A are drawn from their chamber and separated and brought to the raised position, (shown in Figs. 1 and 2,) and the gate is thereby closed. The upper ends of the arms J are connected with the upper bar of the series A by the arm inclosing stirrups N, whereby as said arms J are thrown upwardly motion is communicated therefrom to the upper bar A of said series. The flexible connection B permits the bars A to be brought together, so as to occupy but small space when the gate is open, while said series of bars when in a raised position are prevented from being deflected or brought out of line with each other by the stationary vertical rods O O, which rods O are connected at their upper ends with the side posts C by the brackets P, while their lower ends are connected with the sides of the driveway.

It will, of course, be understood that the bars A have loosely-fitting apertures for the reception of said rods O, which permit of the said bars being moved freely upwardly and downwardly thereon. Thus it will be obvious that the rods O will prevent the several bars from being thrown out of alinement with each other and stock from crowding through between the ends of the bars and the supporting-posts. To prevent the bars from being accidentally forced downwardly by a person climbing over the gate, or by stock pressing down on any of them, I have provided means for locking said series of bars in their open position, consisting in the swinging stirrups R R, which are pivotally supported from the brackets P, and are adapted to engage beneath the respective ends of the upper bar A, as shown in Fig. 1.

The stirrups R are respectively provided with contact-bearings S S, which bear against the under side of the upper ends of the arms J of the operating-levers, whereby as said arms J are forced downwardly by the action of the approaching vehicle against the upper horizontal arms of the stirrups R said stirrups will be respectively forced outwardly and disengaged from the respective ends of said upper bar when said series of bars will be forced downwardly by the downward movement of said operating-lever.

It will be understood that as the vehicle passes away from the gate and is brought in contact with the short arm M of the operating-lever and said series of bars are raised to the position indicated in Fig. 1 said stirrups R will be brought back to the vertical position shown by their own gravity, whereby said series of bars are again locked in their open position.

While I have referred to the flexible connections D as a "cord" it will of course, be understood that any other form of flexible connections may be substituted for those shown.

Having thus described my invention, what I claim as new, and desire to secure by Letters Patent, is—

1. In an automatic gate, the combination of a plurality of bars; means for flexibly connecting said bars together; two sets of three-armed levers respectively connected with the driveway upon each side of the gate, the long arms of each set of levers being connected with the upper bars of the gate, one of the short arms of said set of levers being formed substantially upon the same plane with the long arms, the other short arm being formed at an angle to the long arm.

2. In an automatic gate, the combination of a plurality of bars arranged in a vertical series, one above another; means for flexibly connecting said bars together; vertical guide-rods located near the respective ends of said bars with which said bars are slidably connected; two sets of three-armed levers respectively pivotally connected with the driveways upon the respective sides of the gate; means for connecting the long arms of each set of levers with the upper bar of the series, one of the short arms of said set being formed substantially upon the same plane with the long arms and the other short arm being formed at an angle to the long arm, substantially as and for the purpose specified.

In testimony whereof I affix my signature in the presence of two witnesses.

CHARLES W. MARSH.

Witnesses:
    AUGUST SCHROEDER,
    J. M. SCHUMEKOSKY.